United States Patent Office 2,713,401
Patented July 19, 1955

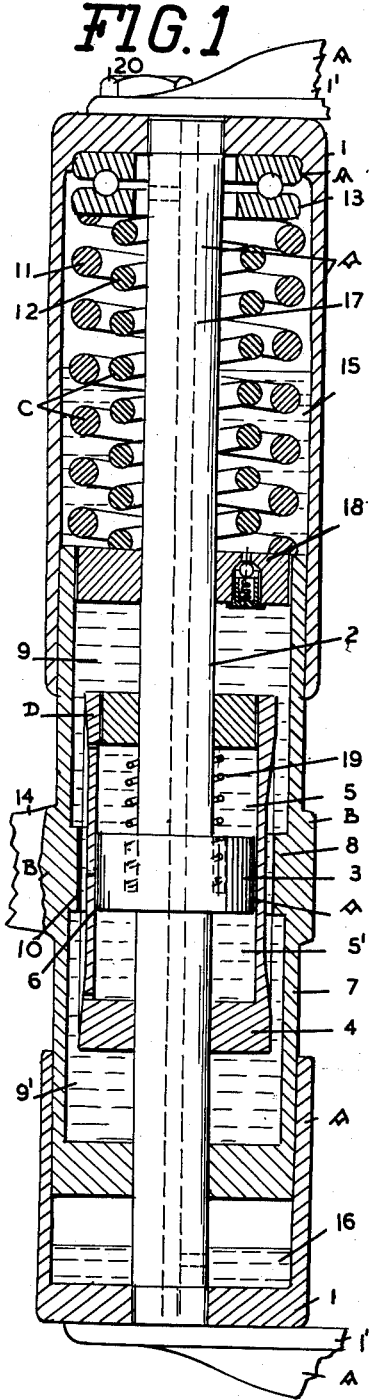
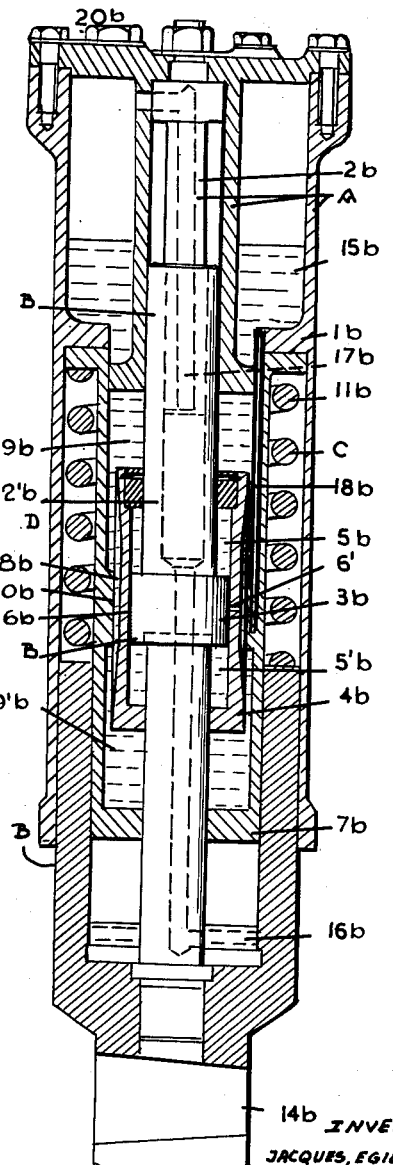

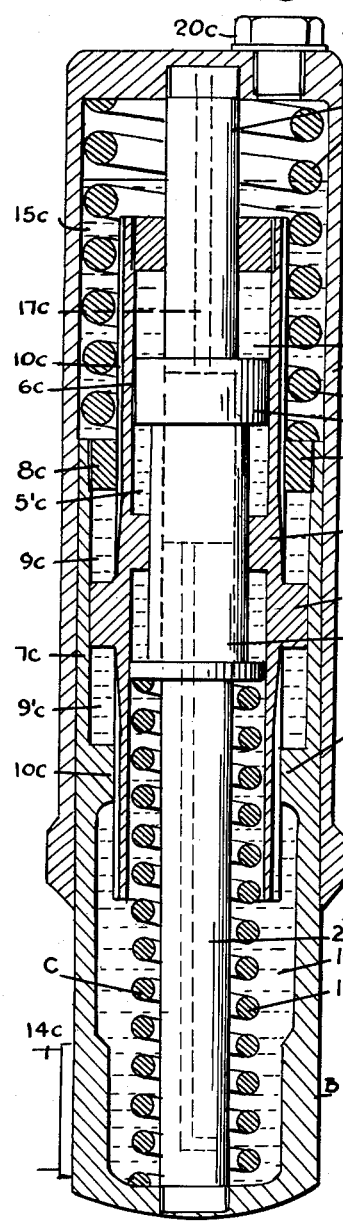
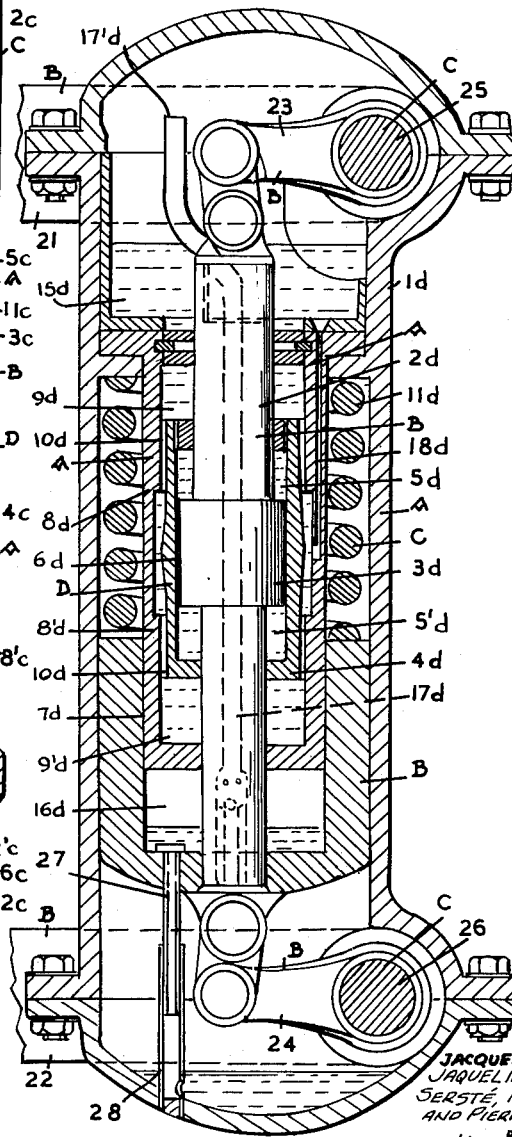

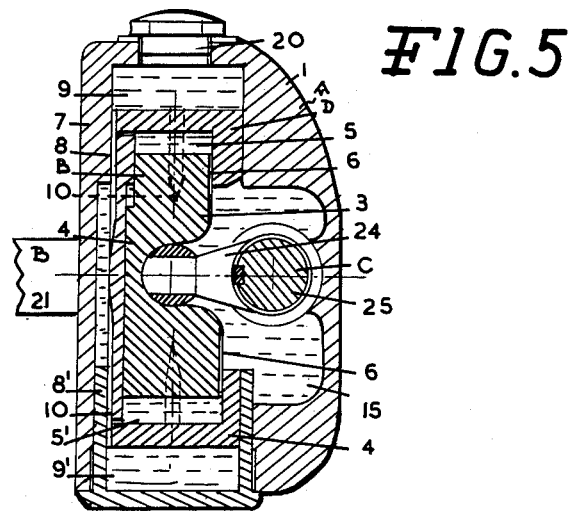
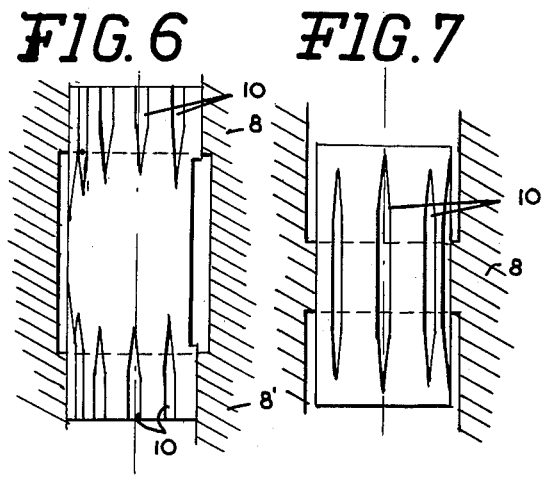

2,713,401

HYDRAULIC SHOCK ABSORBER

Jacques Egide Sersté, Jacqueline Teplow, born Sersté, Pierre François Sersté, and Paul Augustus Sersté, Forest-Brussels, Belgium Application January 16, 1950, Serial No. 138,858

17 Claims. (Cl. 188—88)

Our invention has for its object an elastic suspension for vehicles and the like machines requiring similar suspensions wherein the abnormal movements toward and away from one another of the load and bearing members are braked through the gradual throttling of the transfer channels operating through ejection of the liquid submitted to pressure in chambers formed between elements which are arranged for sliding movement in respect to each other.

The apparatus according to the present invention comprises a first hollow cylinder which is adapted to be operatively connected to one of the load or bearing members whose movements with respect to each other are to be damped. This first hollow cylinder is provided on the interior thereof with an inwardly projecting, cylindrical ring portion co-axial with this first cylinder. A second hollow cylinder, which is smaller than the first cylinder, is located within the latter, this second cylinder being coxial with the first cylinder and having an outer side surface of approximately the same diameter as the internal diameter of the above-mentioned ring portion in the interior of the first cylinder. The second cylinder slidably engages this ring portion and is formed with at least one elongated recess which extends along the length of a portion of the outer side surface of the second cylinder which is located opposite and extends in opposite directions beyond the cylindrical ring portion in the first cylinder so that the second cylinder forms in the interior of the first cylinder a first pair of chambers located on opposite sides of the cylindrical ring portion and communicating with each other through this recess. A piston is slidably mounted in this second cylinder and is formed on the outer side surface thereof with an elongated groove means which extends to the opposite ends of the piston so that this piston forms in the interior of the second cylinder a second pair of chambers respectively located on opposite sides of the piston and communicating with each other through the above-mentioned elongated groove means. Means are provided to interconnect this piston with the other of the load and bearing members so that when the latter move with respect to each other and when the above-mentioned first and second pairs of chambers are filled with a hydraulic liquid, the first cylinder and piston will move with respect to each other to cause the second cylinder, which is submerged and floats in the liquid in the first cylinder, and the cylindrical ring portion in the interior of the first cylinder to move with respect to each other until this ring portion is located at a part of the outer surface of the second cylider which is beyond the recess thereof so that in this way the ring portion seals the above-mentioned first pair of chambers from each other. The gradual cutting out of any passage for the liquid under pressure corresponds to the end of the movement that has already been gradually slowed down.

Our invention will be better understood from the reading of the following description, reference being made to accompanying drawings illustrating by way of example a number of embodiments. In said drawings:

Fig. 1 is an axial cross-section of the elastic suspension according to the present invention incorporating interconnected casings secured to the load;

Fig. 2 is an axial cross-section of a modification wherein the group of elements rigid with the bearing moves with the wheel and bears on the suspension means;

Fig. 3 is an axial cross-section of a further embodiment wherein the group of elements rigid with the bearing includes two rings slidingly engaging the floating member while the floating member carries a further ring operating through a sliding fluid-tight movement in the direction opposed to the two former rings;

Fig. 4 is an axial cross-section of a modification wherein arms pivotally secured to the axle act two by two;

Fig. 5 is a cross-section of a modification wherein the spindle of the suspension casing provides for damping purposes, while serving for torsional suspension; and Figs. 6 and 7 illustrate the rings provided with gradually acting flutings of different lengths.

In the several figures, similar characters designate elements which are analogous to each other or which perform analogous functions.

Turning to the drawings, the mechanism of the suspension according to our invention includes chiefly a group of members rigid with the load and designated by A, a further group of elements rigid with the bearing means and designated by B, an elastic suspension element or group of elements inserted between the groups A and B and designated by C, a floating element or group of elements providing an automatic balancing of pressures in order to ensure an optimum ratio for a gradual damping operation, said floating means being designated by D.

For furthering the understanding and in view of an easier disclosure, Figs. 1 to 5 are drawn so as to show the automatic suspension means as adjusted for an average load.

In Fig. 1 there is illustrated an outer structure which is fixed to the load and which is formed by two casings 1, the latter are secured to the load through the brackets 1' and their covers are rigidly connected together through the spindle 2.

A hollow cylinder 7 is connected to the turning parts of the vehicle and includes two opposite end walls which define a space that is filled with liquid. The opposite ends of cylinder 7 form two pistons slidingly engaging the corresponding casings 1 wherein said pistons reciprocate and are suspended between the load and its bearing means so as to act on the springs 11 and 12, these springs forming the suspension structure C. The steering of the vehicle is ensured by the pivotal movement of the springs 11 and 12 with reference to the roller bearings 13 when the wheel-carrying axle 14 is caused to move.

A floating member in the form of a second hollow cylinder 4, through which the spindle 2 extends, is entirely submerged in the liquid in the first-mentioned hollow cylinder 7.

An inwardly projecting cylindrical ring portion 8 is provided on the interior of the cylinder 7 and is coaxial with the latter.

The outer side surface of the cylinder 4 is formed with elongated recesses 10 which form communicating passages between the parts of cylinder 7 respectively located on the opposite sides of ring 8, these recesses or flutings 10 being formed so that a large capacity of output is provided towards the middle of their length while they narrow progressively towards the two ends of the cylinder 4 where they merge into peripheral smooth surfaces which fluidtightly engage the ring 8 and thus close the passage for the liquid under pressure when the ring 8 has attained a limiting position corresponding to the maximum relative displacement of cylinder 4 with respect to ring 8.

The piston 3, fixed to the spindle 2, is slidably located in the interior of cylinder 4 and one or more grooves 6 of relatively small size extend between the opposite ends of piston 3 to provide a communication between the chambers in cylinder 4 located on opposite sides of piston 3 and permitting a slow movement of liquid from one of these chambers to the other of the chambers upon relative movement between piston 3 and cylinder 4. There are thus formed in the interior of the cylinder 4 and on opposite sides of the piston 3 two compensating chambers 5 and 5', while the space between the cylinders 4 and 7 is subdivided by the ring 8 into two damping chambers 9 and 9'. The several chambers are filled with a hydraulic liquid and the chambers 15 and 16, respectively formed in the casings 1 by the opposite end portions of the cylinder 7, hold a reserve of liquid which serves to compensate for the loss of liquid resulting from eventual leaks. An axial bore 17 is formed in the spindle 2 and communicates with the chambers 15 and 16 to enable liquid to be introduced into the chamber 9 as a result of the pressure produced on the liquid in chamber 16 by the bottom end of cylinder 7, this liquid passing through the valve mechanism 18 located in the top wall of cylinder 7, as viewed in Fig. 1. A spring 19 is interposed between the top face of piston 3 and the top wall of cylinder 4 and to maintain the cylinder 4 in its position of rest.

A plug 20 is screwed into the top wall of the top casing 1 to close the latter.

The above described structure operates as follows:

If structure B is jolted upwards, this upward movement is cushioned in several ways. The springs 11 and 12 will resist upward movement of B by being compressed between the upper portion of cylinder 7 and bearing 13. Simultaneously, the volume of chamber 9' will be decreased and fluid will be throttled through channel 10 into chamber 9. Either simultaneously with this throttling action or after ring 8 has travelled upwardly sufficiently so as to close channel 10, cylinder 4 will be carried upwardly causing the volume of chamber 5' to decrease. The latter results in liquid being throttled through channel 6 into chamber 5.

In Fig. 2, the casing 1b, fixed to the load and thus forming the structure A, is in this case fixed to the cylinder 7b which is filled with a hydraulic liquid, which is provided with an inwardly projecting, annular ring 8b, as described above, and which encloses a cylinder 4b slidably engaging the ring 8b and forming in the interior of cylinder 7b the two damping chambers 9b and 9'b, this cylinder 4b being formed with elongated recesses in the form of flutings 10b, as described above.

The structure B is interposed between the casing 1b and cylinder 7b and is joined to a rotating part which is fixed to structure B at 14b.

The suspension structure C is in the form of a spring 11b located between a top flanged part of cylinder 7b and the top surface of structure B. The structure B carries the piston 3b through the medium of the spindle 2'b which is formed with an axial bore. In this axial bore there is slidably located the spindle 2b fixed to the structure A connected to the load.

The piston 3b is formed with elongated groove 6b which provides a communication between the chambers 5b and 5'b located on opposite sides of the piston 3b within the floating cylinder 4b, the flutings 10b on the outer surface of cylinder 4b providing a communication between chambers 9b and 9'b. The spindles 2b and 2'b are axially bored to provide the passage 17b providing communication between the chambers 15b and 16b, the relative movement between the spindles 2b and 2'b causing the latter to act as a pump for lifting liquid from the chamber 16b to the chamber 15b in order to compensate for the eventual loss of hydraulic liquid in several chambers, the liquid flowing from the chamber 15b to the interior of cylinder 7b through the passage 18b.

In that embodiment of the invention which is illustrated in Fig. 3, the cylinder 7c forms part of the structure B, as in the embodiment of Fig. 1, but it is provided with two inwardly projecting annular rings 8c and 8'c which form the transverse walls of a liquid filled space which is divided into the two chambers 9c and 9'c by an outwardly projecting annular ring located between the rings 8c and 8'c and formed on the outer surface of the cylinder 4c. The piston 3c is mounted on the spindle 2c which is fixed to casing 1c forming part of the structure A, and this piston 3c forms in the interior of the cylinder 4c the two chambers 5c and 5'c.

The spindle 2'c is fixed to the structure B and slides within an axial bore in the spindle 2c, the spindles 2c and 2'c both being axially bored as indicated at 17c to provide communication between the chambers 15c and 16c, as described above.

In the embodiment of Fig. 3, the structure C includes a spring 11c, located between the top part of cylinder 7c and the top wall of casing 1c, and a spring 12c, located between an annular projection carried by spring 2'c and the bottom walls of structure B.

The part of spindle 2c located on the lower side of piston 3c, as viewed in Fig. 3, is of a larger diameter than the part of spindle 2c located on the top side of piston 3c so that the working surface of piston 3c in the chamber 5c is greater than the working surface of piston 3c in chamber 5'c. This difference is intended for the case where the resistance to the movement in one direction should be more considerable than the resistance in movement in the opposite direction, whereby the element D is brought more speedily and more energetically into its braking position for one direction of movement than for the opposite direction, as provided by the different resistances afforded by the chambers 5c and 5'c.

As is shown in Fig. 3, two sets of flutings 10c are provided on each side of the annular ring projecting from the outer intermediate surface portion of cylinder 4c, these flutings merging into the intermediate outer surface portion and extending away from the outer ring of cylinder 4c to the ends of the latter. The top set of flutings 10c of Fig. 3 cooperate with the annular ring 8c and the bottom set of flutings 10c cooperate with the annular ring 8'c, so that when the cylinders 4c and 7c move with respect to each other a seal is provided when the annular rings 8c or 8'c are respectively located opposite the outwardly projecting annular ring of cylinder 4c. The two sets of flutings 10c respectively have their largest cross-sections located within the chambers 15c and 16c, so that these chambers 15c and 16c respectively communicate with the chambers 9c and 9'c to permit hydraulic fluid to flow in opposite directions between the chambers 15c and 9c, on the one hand, and the chambers 16c and 9'c on the other hand.

When the load causes the structure A of Fig. 3 to move downwardly with respect to the structure B, the piston 3c produces a pressure on the hydraulic liquid in chamber 5'c so as to cause the cylinder 4c to be displaced downwardly, and thus the ring on the outer surface of cylinder 4c approaches the annular ring 8'c. In this way the volume of chamber 9'c diminishes while that of chamber 9c increases, and some liquid is supplied to chamber 9c from chamber 15c, on the one hand, while liquid is ejected from chamber 16c and supplied to chamber 15c through the passage 17c, on the other hand.

In the embodiment of Fig. 4 the casing 1d is completely closed and fixed to the load, such as the chassis of a vehicle, and forms the structure A. The cylinder 7d is fixed to the casing 1d.

The structure B includes the spindle 2d which carries the piston 3d and which is pivotally connected at its upper part to a link 23 and at its lower part is fixedly connected to the structure B. The latter is pivotally connected at its lower end to the link 24. The links 23 and 24 are fixedly connected to the torsion bars 25 and 26, forming part of the suspension structure C, and these bars 25 and 26 are in turn fixedly connected to the elongated members 21 and 22 which are pivotally joined to a support, such as the rotating parts of a vehicle.

In addition to the torsion bars 25 and 26, the suspension structure C includes the spring lid extending between the top edge of the structure B, located between cylinder 7d and casing 1d, and an inwardly projecting, annular flange of casing 1d, as is clearly shown in Fig. 4.

The hollow cylinder or cylindrical member 4d within the cylinder 7d cooperates with the piston 3d, fixed to the spindle 2d, to form the chambers 5d and 5'd, and this cylinder 4d is provided with two sets of flutings 10d respectively extending in opposite directions from an intermediate outer annular surface portion or projection of cylinder 4d up to the opposite ends of the latter.

The cylinder 7d is a hollow liquid-filled member provided with two inwardly projecting anular or ring portions 8d and 8'd respectively cooperating with the two sets of flutings 10d so that upon respective movement between the cylinders 4d and 7d, one or the other of the ring portions or annular inner projections 8d or 8'd will be located on the intermediate outer surface portion of cylinder 4d which is located between the two sets of flutings 10d so as to prevent the passage of fluid through one or the other of these sets of flutings 10d.

When the load descends, the casing 1d, which is fixed to the load, causes the levers 21 and 22 to turn at their pivotal connections, and, as a result of the connection of links 23 and 24 to members 21 and 22 through the torsion bars 25 and 26, these links 23 and 24 will turn in a clockwise direction, as viewed in Fig. 4, about the axes of torsion bars 25 and 26, respectively. This turning of the links 23 and 24 will be resisted both by the torsion bars 25 and 26 and by the spring 11d. Thus, the piston 3d will move upwardly with respect to the casing 1d and the cylinder 7d fixed thereto, and this will place the chamber 5d under pressure so as to cause the cylinder 4d to move upwardly with respect to the cylinder 7d so that the ring portion 8d and the intermediate outer surface portion of cylinder 4d approach and become located opposite each other so as to prevent hydraulic fluid from leaving chamber 9d and flowing to chamber 9'd, in the cylinder 7d, and in this way the relative movement of the load and bearing parts is damped. Between ring portions 8d and 8'd, cylinder 7d includes an intermediate chamber respectively communicating with chambers 9d and 9'd through the two sets of flutings 10d, this intermediate chamber thus providing communication between chambers 9d and 9'd.

A pump 27 in the form of a hollow tubular piston fixed to the lower wall of structure B and communicating with chamber 16d, and a tube, telescopically cooperating with this hollow piston, fixed to the lower wall of casing 1d and formed with an opening communicating with the chamber 28, enables a reserve of hydraulic fluid in the chamber 28 to be pumped into the chamber 16d from the casing 1d when the casing 1d and structure B move with respect to each other, this liquid in chamber 16d flowing through the axial bore 17d of spindle 2d and out through the top open end of a tube 17'd, located in the chamber 15d, when the bottom wall of the slidable structure B and the bottom wall of cylinder 7d approach each other, this passage 17d being in communication with the chamber 16d, as is shown in dotted lines in Fig. 4. Liquid may also flow from the chamber 15d to the interior of the cylinder 7d through the passage 18d. This passage communicates with the interior of the cylinder 7d adjacent the ring portions 8d and 8'd.

The flow of liquid through the passage 18d to the chambers 9d and 9'd is controlled by the position of the ring portions 8d and 8'd and the intermediate outer surface portion of the cylinder 4d relative to each other so that when, for example, the outer surface portion of the cylinder 4d lies opposite the ring portion 8d, no liquid can be fed into the chamber 9d from the passage 18d. The arrangement is such that the flow of liquid from the passage 18d to either of the chambers is cut off after the cylinder 4d has travelled a predetermined distance toward such chamber.

In the embodiment of the invention which is illustrated in Fig. 5, the link 24e is connected by a ball and socket structure to an intermediate part of the piston 3e and is fixedly connected to the torsion bar 25e of the suspension structure C, this torsion bar 25e being in turn fixedly connected to the member 21e which is linked, for example, to a rotating part of the vehicle. In this way the piston 3e is directly actuated by the turning movements of the member 21, the piston 3e thus forming part of the structure B. The casing 1e in the embodiment of Fig. 5 is formed in substantially one piece with the cylinder 7e and is fixed to the load so as to form part of the structure A, and the hollow cylinder 4e is slidably mounted within the cylinder 7e and formed with opposite sets of flutings 10e respectively extending in opposite directions from an intermediate outer surface portion of the cylinder 4e as in the case of embodiment of Fig. 4. The cylinder 7e is provided with the inwardly extending annular ring portions 8e and 8'e which respectively cooperate with the two sets of flutings 10e, in the same way as was described above in connection with Fig. 4. Thus, in the embodiment of Fig. 5, the cylinder 4e provides on the interior of cylinder 7e the fluid-filled chambers 9e and 9'e, communicating with each other through the intermediate chamber between ring portions 8e and 8'e, and the piston 3e forms in the interior of the cylinder 4e the chambers 5e and 5'e. In the embodiment of Fig. 5 the link 24e extends through a side opening in the cylinder 4e so that the piston 3e is directly located in the chamber 15e which communicates with the chambers 5e and 5'e through the groove means 6e formed on the piston 3e, so that these latter two chambers are in this way in communication with each other. The structure of Fig. 5 operates in the same way as the structure of Fig. 4, described above, in that upon downward movement, for example, of the casing 1e fixed to the load, the link 24e will turn in a clockwise direction, as viewed in Fig. 5, about the axis of torsion bar 25e to cause the piston 3e to move upwardly with respect to casing 1e and thereby produce an upward displacement of cylinder 4e with respect to cylinder 7e until the upper set of flutings 10e, as viewed in Fig. 5, are closed by cooperation of ring 8e with the central outer surface portion of cylinder 4e located between the two sets of flutings thereon.

In all of the above described embodiments, the hydraulic fluid is supplied through an opening which is closed by the removable threaded plug 20, and the fluid is adapted to flow into the several chambers through suitable small passageways provided in the several cylinders, these passageways being so small that they do not affect the operation of the device.

Figures 6 and 7 illustrate two embodiments of the rings 8 and 8' showing gradually opening flutings formed in the cylinders of Figures 6 and 7, these cylinders corresponding to the cylinders 4 described above. The flutings 10 of Figs. 6 and 7 have different depths so as to ensure a gradual engagement through their successive closing during each stroke.

The arrangements illustrated have been disclosed by way of a mere exemplification and by no means in a limiting sense, as obviously the field of application of the invention as defined in the accompanying claims is exceedingly wide. Thus the embodiments according to Figs. 1, 2 and 3 are illustrated as mounted to the front of a vehicle although it is just as easy to mount them at the rear. The case is the same for the other embodiments; thus the apparatus illustrated in Fig. 4 may as well include a system of arms 22 and pivots 26 outside the casing 1 so as to play only the part of a guide for the wheel-carrying spindle or the like while cooperating with the suspension means; the arrangement of Fig. 5 should also be associated with guiding means for the wheel spindle or the like wheel-carrying member. In most of the possible embodiments of our invention, the position and part played by the different members may be interchanged without any modification in the purpose of the arrangements considered.

What we claim is:

1. A hydraulically braked shock damper for varying loads chiefly for use on vehicles and the like carried on a support, comprising elements rigid respectively with the load and with the support and adapted to slide longitudinally with reference to one another, a cylindrical damping chamber carried by one of said elements, the axis of which registers with the direction of relative movement between the load and the support, a chambered liquid-filled member slidingly fitted inside the other element and separating said damping chamber into two separate elementary damping chambers, said chambered member being adapted to slide longitudinally with reference to the element in which it is fitted under the action of the relative movement between the two elements and means feeding a liquid to the elementary damping chambers and including a gradually closing passage for the exit of liquid into each elementary damping chamber to either side of said chambered member to close completely the elementary chamber to which liquid is being fed before the end of the corresponding sliding movement, said gradually closing passage being defined by a projection fixed to said damping chamber and a recess formed in the outer surface of the chambered member, extending across said projection, terminating short of the ends of said chambered member to provide the latter with terminal surfaces engaging fluid-tightly the projection fixed to said damping chamber at the end of the corresponding stroke.

2. A hydraulically braked shock damper for varying loads for use on vehicles and the like carried on a support comprising elements rigid respectively with the load and with the support and adapted to slide longitudinally with reference to one another, a chambered liquid filled member fitted inside one of the said elements and adapted to slide longitudinally with reference to last mentioned element under the action of the relative movement between the two elements, three ring-shaped projections defining two separate elementary damping chambers and of which the central projection on one hand and the outer projections on the other are rigid respectively with said chambered member and said one element, and means feeding a liquid to the elementary damping chambers and including at least one passage of gradually increasing cross-section opening into the elementary damping chambers cooperating with the outer projections to close completely the elementary chamber to which liquid is being fed before the end of the corresponding sliding movement of the liquid-filled member.

3. A hydraulically braked shock damper for varying loads chiefly for use on vehicles and the like carried on a support comprising at least two elements connected respectively with the load and with the support and adapted to slide longitudinally with reference to one another, a hollow cylindrical member carried by one of said elements, the axis of said cylindrical member registering with the direction of relative movement between said elements, a hollow liquid-filled member fitted inside the other of said elements, said cylindrical member being arranged within said liquid-filled member and adapted to slide longitudinally relative thereto when said elements are moved relative to each other, at least one annular outer projection on said cylindrical member, at least one annular inner projection on said liquid-filled member, the associated annular projections defining within said liquid-filled member two separate chambers, and means for feeding a liquid to said chambers and including a passage formed in said liquid-filled member and communicating with the interior thereof adjacent said inner projection thereof, the flow of liquid from said passage being controlled by the position of said annular projections relative to each other and consequently by the position of said cylindrical member and said liquid-filled member relative to each other so that the flow of liquid from said passage to at least one of said chambers is cut off after said cylindrical member has slidden within said liquid-filled member a predetermined distance toward said one chamber.

4. A hydraulic damper applicable to vehicle and the like systems, the component parts of which are submitted to relative vibratory and oscillatory impulses, comprising three coaxial tubular cylindrical members, means whereby the impulses to be braked that are applied to the vehicle and the like systems are transmitted to two of said members while the third member is mechanically independent with reference to said members and transverse annular partitions guiding the relative movements between the three members and adapted to define two series of fluid-filled cells, the first series of cells acting as a braking resistance and the second series acting as automatic adjusting means for the braking operation in the first cells while the third cylindrical tubular member cooperating in the formation of the two series of cells is held hydraulically suspended between the two first mentioned controlled tubular members.

5. A hydraulic damper applicable to vehicle and the like systems, the component parts of which are submitted to relative vibratory and oscillatory impulses, comprising three coaxial tubular cylindrical members, means whereby the impulses to be braked that are applied to the vehicle and the like systems are transmitted to two of said members while the third member is mechanically independent with reference to said members and transverse annular partitions guiding the relative movements between the three members and adapted to define two series of fluid-filled cells, the first series of cells acting as a braking resistance and the second series acting as automatic adjusting means for the braking operation in the first cells while the third cylindrical tubular member cooperating in the formation of the two series of cells is held hydraulically suspended between the two first mentioned controlled tubular members and means whereby one of the transverse partitions limiting the braking cells controls the connection between the different braking cells, said means including at least one passage formed in the wall of one of the tubular members.

6. A hydraulic damper applicable to vehicle and the like systems, the component parts of which are submitted to relative vibratory and oscillatory impulses, comprising three coaxial tubular cylindrical members, means whereby the impulses to be braked that are applied to the vehicle and the like systems are transmitted to two of said members while the third member is mechanically independent with reference to said members and transverse annular partitions guiding the relative movements between the three members and adapted to define two series of fluid-filled cells, the first series of cells acting as a braking resistance and the second series acting as automatic adjusting means for the braking operation in the first cells while the third cylindrical tubular member cooperating in the formation of the two series of cells is held hydraulically suspended between the two first mentioned controlled tubular members, means whereby at least two transverse members limiting the braking cells control the connection between the braking cells, said means including at least two diametrically opposed passages formed in the lateral walls defining the braking cells, and a provision of braking liquid opening into said passages.

7. A hydraulic damper applicable to vehicle and the like systems, the component parts of which are submitted to relative vibratory and oscillatory impulses, comprising three coaxial tubular cylindrical members, means whereby the impulses to be braked that are applied to the vehicle and the like systems are transmitted to two of said members while the third member is mechanically independent with reference to said members and transverse annular partitions guiding the relative movements between the three members and adapted to define two series of fluid-filled cells, the first series of cells acting as a braking resistance and the second series acting as automatic adjusting means for the braking operation in the first cells while the third cylindrical tubular member cooperating in the formation of the two series of cells is held hydraulically suspended between the two first mentioned controlled tubular members, means connecting the braking cells and including at least one passage connecting said cells and adapted to assume a gradually reduced cross-section during the progression of the relative movements producing a braking action and to allow a gradually lesser amount of liquid to pass between the braking cells as the length of the braking stroke increases.

8. A hydraulic damper applicable to vehicle and the like systems, the component parts of which are submitted to relative vibratory and oscillatory impulses, comprising three coaxial tubular cylindrical members, means whereby the impulses to be braked that are applied to the vehicle and the like systems are transmitted to two of said members while the third member is mechanically independent with reference to said members and transverse annular partitions guiding the relative movements between the three members and adapted to define two series of fluid-filled cells, the first series of cells acting as a braking resistance and the second series acting as automatic adjusting means for the braking operation in the first cells while the third cylindrical tubular member cooperating in the formation of the two series of cells is held hydraulically suspended between the two first mentioned controlled tubular members, a container for a provision of braking liquid and means connecting the braking cells with said container and including at least one passage connecting said cells and adapted to assume a gradually reduced cross-section during the progression of the relative movements producing a braking action and to allow a gradually lesser amount of liquid to pass between the braking cells as the length of the braking stroke increases.

9. A hydraulic damper applicable to vehicle and the like systems, the component parts of which are submitted to relative vibratory and oscillatory impulses, comprising three coaxial tubular cylindrical members, means whereby the impulses to be braked that are applied to the vehicle and the like systems are transmitted to two of said members while the third member is mechanically independent with reference to said members and transverse annular partitions guiding the relative movements between the three members and adapted to define two series of fluid-filled cells, the first series of cells acting as a braking resistance and the second series acting as automatic adjusting means for the braking operation in the first cells while the third cylindrical tubular member cooperating in the formation of the two series of cells is held hydraulically suspended between the two first mentioned controlled tubular members, means connecting the braking cells and including at least one passage connecting said cells and adapted to assume a gradually reduced cross-section during the progression of the relative movements producing a braking action and to allow a gradually lesser amount of liquid to pass between the braking cells as the length of the braking stroke increases, at least two braking cells having an opposite action closing gradually, before the liquid is completely expelled out of them, through the sliding contact between the corresponding control partition and the cylindrical portion of the cooperating tubular member at a point corresponding to the end of the passage having a zero cross-section to stop the relative stroke between the members on an entirely enclosed mass of liquid.

10. A hydraulic damper applicable to vehicle and the like systems, the component parts of which are submitted to relative vibratory and oscillatory impulses, comprising three coaxial tubular cylindrical members, means whereby the impulses to be braked that are applied to the vehicle and the like systems are transmitted to two of said members while the third member is mechanically independent with reference to said members and transverse annular partitions guiding the relative movements between the three members and adapted to define two series of fluid-filled cells, the first series of cells acting as a braking resistance and the second series acting as automatic adjusting means for the braking operation in the first cells while the third cylindrical tubular member cooperating in the formation of the two series of cells is held hydraulically suspended between the two first mentioned controlled tubular members, a container for a provision of braking liquid and means connecting the braking cells with said container and including at least one passage connecting said cells and adapted to assume a gradually reduced cross-section during the progression of the relative movements producing a braking action and to allow a gradually lesser amount of liquid to pass between the braking cells as the length of the braking stroke increases, at least two braking cells having an opposite action closing gradually, before the liquid is completely expelled out of them, through the sliding contact between the corresponding control partition and the cylindrical portion of the cooperating tubular member at a point corresponding to the end of the passage having a zero cross-section to stop the relative travel between the members on an entirely enclosed mass of liquid.

11. Damping apparatus for damping the relative movement between a pair of members, comprising, in combination, a first hollow cylinder adapted to be operatively connected to one of the members for movement therewith and having in the interior thereof an inwardly projecting, cylindrical ring portion coaxial with said cylinder; a second hollow cylinder smaller than said first cylinder and located within the same, said second cylinder being coaxial with said first cylinder and having an outer side surface of approximately the same diameter as the internal diameter of said ring portion and slidably engaging the same, and said second cylinder being formed with an elongated recess extending along the length of a portion of said outer side surface thereof which is located opposite and extends in opposite directions beyond said cylindrical ring portion so that said second cylinder forms in the interior of said first cylinder a first pair of chambers located on opposite sides of said cylindrical ring portion and communicating with each other through said recess; a piston means slidably mounted in said second cylinder and being formed with an elongated passage means extending to opposite ends of said piston means, so that said piston means forms in the interior of said second cylinder a second pair of chambers respectively located on opposite sides of said piston means and communicating with each other through said passage means; and connecting means joined to said piston means and being adapted to be operatively connected to the other of the members for connecting said piston means to the other member, whereby, when all of said chambers are filled with a hydraulic fluid and the members move with respect to each other, said first cylinder and piston means will also move with respect to each other to cause said second cylinder, which is submerged and floats in the fluid in said first cylinder, and the latter to move with respect to each other until said cylindrical ring portion is located at a portion of said outer surface of said second cylinder beyond said recess so as to seal said pair of first chambers from each other.

12. An apparatus as defined in claim 11 and wherein said recess in said outer surface of said second cylinder gradually merges into said portion of said outer surface beyond said recess so as to produce a gradual sealing of said pair of first chambers.

13. An apparatus as defined in claim 11 and wherein said recess extends along an intermediate part of the length of said outer surface of said second cylinder.

14. An apparatus as defined in claim 11 and wherein said recess extends from one end of said second cylinder to an intermediate part thereof where said outer side surface portion of said second cylinder beyond said recess is located, and a second recess extending from said intermediate part of said second cylinder, on the opposite side thereof from said first-mentioned recess, to the opposite end of said second cylinder, said recesses gradually merging into said intermediate part of said second cylinder and being largest at the opposite ends of said second cylinder, respectively.

15. Apparatus as defined in claim 11 and wherein said first pair of chambers may be located between lateral walls forming said second pair of chambers, while said second pair of chambers may be located between lateral walls of said first pair of chambers.

16. Apparatus as defined in claim 11 and wherein said first pair of chambers may be formed by hollowing out at least one of the lateral walls forming these chambers and by fixing said ring portion to assure control and to serve as a transverse wall of said first pair of chambers.

17. Apparatus as defined in claim 11 and wherein said second pair of chambers may be formed by fixing a ring portion to a lateral wall, according to the required needs, and in the case where said piston means becomes a ring, by its attachment to the exterior wall forming the second pair of chambers and by its sliding engagement with the connected lateral wall, so that it is this latter ring which provides the communicating passage.

References Cited in the file of this patent

UNITED STATES PATENTS

| | | |
|---|---|---|
| Re. 17,184 | Wolf | Jan. 1, 1927 |
| 1,072,350 | Müller | Sept. 2, 1913 |
| 1,584,884 | Merrick | May 18, 1926 |
| 2,072,173 | Lottritz | Mar. 2, 1937 |
| 2,088,875 | Sersté | Aug. 3, 1937 |

FOREIGN PATENTS

| | | |
|---|---|---|
| 668,926 | Great Britain | Mar. 26, 1952 |